United States Patent [19]
Showalter et al.

[11] Patent Number: 5,520,580
[45] Date of Patent: May 28, 1996

[54] AIR HANDLER TO CONTROL AIR SUPPLY IN CONFINEMENT BUILDINGS FOR POULTRY AND LIVESTOCK

[76] Inventors: Harry H. Showalter, Rte. #1—Box 409A, Dayton, Va. 22821; Larry L. Showalter, Rte. 2, Box 203, Bridgewater, Va. 22812

[21] Appl. No.: 367,722

[22] Filed: Jan. 3, 1995

[51] Int. Cl.[6] ............................................. F24F 13/10
[52] U.S. Cl. ..................................... 454/273; 454/333
[58] Field of Search ............................... 454/253, 271, 454/273, 322, 333

[56] References Cited

U.S. PATENT DOCUMENTS

| | | |
|---|---|---|
| 2,273,758 | 2/1942 | Kubatzky .................. 454/273 |
| 2,995,077 | 8/1961 | Kitson . |
| 3,706,271 | 12/1972 | Mieczkowski ............... 454/322 |
| 3,951,336 | 4/1976 | Miller et al. ............. 454/333 X |
| 4,498,373 | 2/1985 | Dittmer et al. ............ 454/253 |
| 5,088,388 | 2/1992 | Schaefer .................... 454/271 |

FOREIGN PATENT DOCUMENTS 144246  3/1931  Switzerland ............... 454/358

*Primary Examiner*—Harold Joyce
*Attorney, Agent, or Firm*—Eli Lieberman

[57] ABSTRACT

An air handler mounted on the wall of a confinement building for poultry and livestock to control the amount and direction of makeup air. A curved baffle is mounted on an open bearing within an opening in the building wall. Pivotal and rocking motion of the baffle directs air to all parts of the building including the side wall supporting the air handler.

18 Claims, 4 Drawing Sheets

5,520,580

AIR HANDLER TO CONTROL AIR SUPPLY IN CONFINEMENT BUILDINGS FOR POULTRY AND LIVESTOCK

BACKGROUND OF THE INVENTION

This invention relates to an air handler to ventilate a building designed to raise poultry and livestock. By confining the animals, productivity is increased while reducing the operating costs. The practice has found almost universal acceptance in the United States in raising poultry.

While achieving many advantages, raising the animals in a densely populated confined area requires precise control of the indoor air quality. Such factors as air temperature, humidity, bacteria count and odor must be closely regulated to avoid the spread of disease and to maintain a desirable animal growth rate.

In addition to the above factors, applicants have determined that the flow of air into poultry houses must be closely regulated to avoid the formation of local cold and hot zones, particularly on floor areas adjacent to the building walls. Because of their relatively small size and reduced mobility in confinement, chickens spending considerable time in cold and hot zones will lag, both in weight and quality, behind the rest of the flock.

A number of ventilating systems for poultry and livestock buildings have been invented as typified by U.S. Pat. No. 2,995,077, issued Aug. 8, 1961 to Gerald L. Kitson and U.S. Pat. No. 3,951,336 issued Apr. 20, 1976 to Loren C. Miller et al. The patent to Kitson shows a ventilating system employing a makeup air system and a separate exhaust system driven by a common motor. While Kitson does teach a deflector to direct the makeup air, the purpose of the deflector is to prevent makeup air from being drawn in by the exhaust fan. Miller et al. show a number of elongated ventilating slots mounted near the roof line. The Miller et al. system is responsive to indoor pressure. The baffles in Miller et al. do not provide precision control over the direction of makeup air.

While the above mentioned patents do teach ventilation systems for poultry and livestock housing, the prior art does not teach a ventilation system having an air handler which can exercise precise control of the discharge of makeup air into the building.

SUMMARY OF THE INVENTION

The overall object of the invention is to improve upon the prior art ventilation systems for poultry and livestock housing by providing a degree of control over the makeup air not previously attainable.

It is a specific object of the invention to provide an air handler which controls the volume and direction of makeup air by means of a single curved baffle mounted for pivotal and rocking motion in the opening of the air handler.

It is another object of the invention to mount the baffle along one longitudinal free edge with its center of gravity forward of the edge to move to open position by the force of gravity. The baffle is under control of a pulley and line attached to a medial portion of the forward edge of the baffle.

It is yet another object of the invention to provide a fulcrum on each side wall of the air handler to permit the baffle free edge to be raised allowing makeup air to be directed over both the convex and concave sides of the baffle.

It is another object of the invention to make the baffle opaque or transparent and of heat insulating construction as an alternative to sheet metal.

DESCRIPTION OF THE PREFERRED EMBODIMENTS

Figure 1:
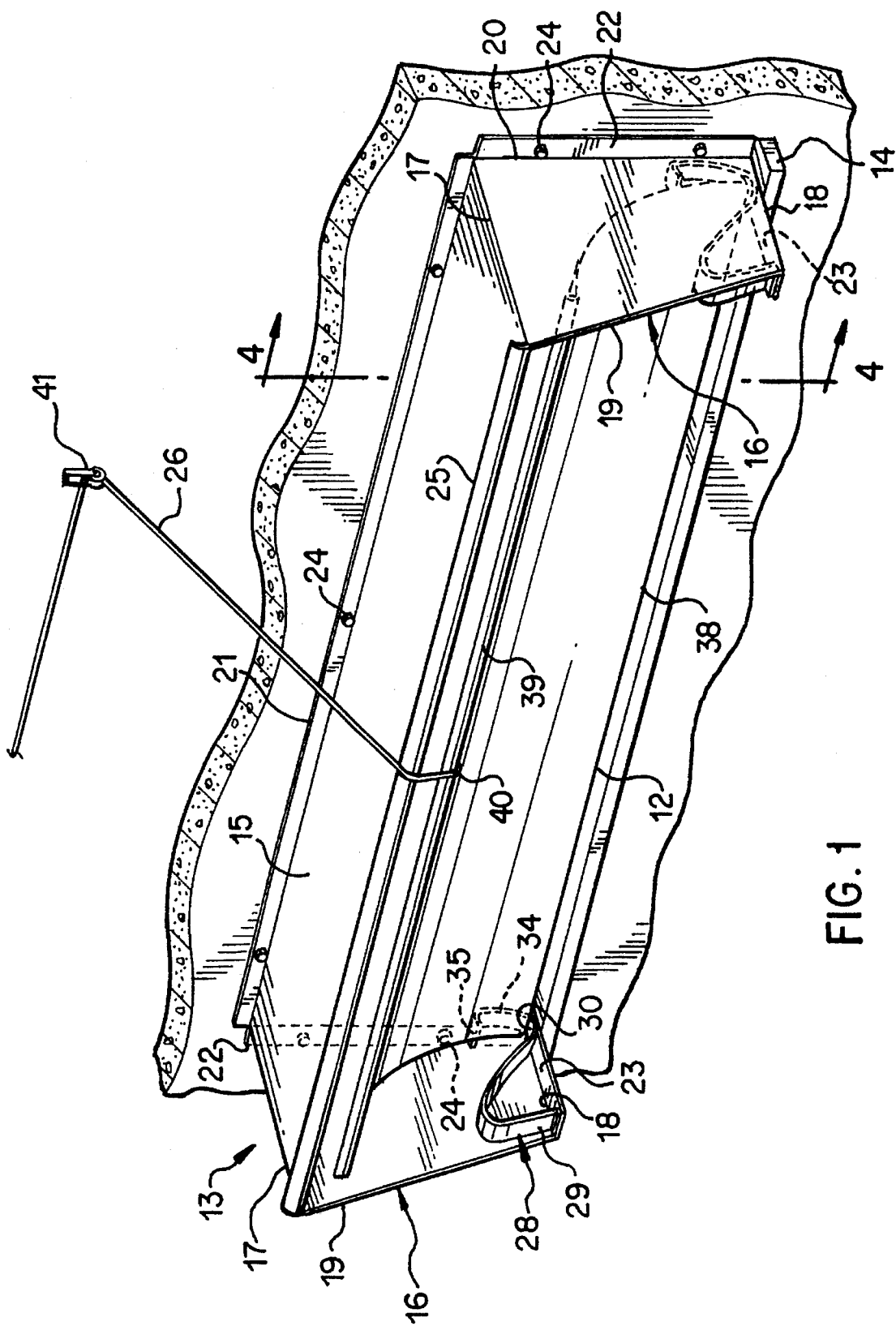
FIG. 1 is a perspective view of the air handler as seen from inside the building.

Referring now in general to the drawings and in particular to FIG. 1, the novel air handler of this invention is mounted on an upper portion of the inside wall of a confinement building. A rectangular opening 12 is provided through the wall of a size to match the air handler 13. A crosspiece 14 having a cross section approximately 1½ inches square and having a length slightly greater than the bottom side of rectangular opening 12 is nailed to the inside wall so that the top of the crosspiece is flush with the bottom side of opening 12. As will be explained in greater detail, the function of the crosspiece is to support the air handler 13 for ease of installation and to function as part of the air control system.

The air handler 13 comprises a three sided housing formed of an elongate rectangular section 15 joined by two substantially trapezoidal sections 16 extending downwardly at right angles from each end of section 15. Each trapezoidal section 16 comprises substantially parallel sides 17 and 18 with top side 17 being longer than bottom side 18. The sides 17 and 18 are joined by a front angled side 19 and a rear vertical side 20. A mounting flange 21 extends upwardly from the rear side of rectangular section 15. A mounting flange 22 extends laterally from side 20 of each trapezoidal section 16. A short mounting flange 23 extends inwardly from side 18 of each trapezoidal section 16 to lie in a facing relationship.

The three sided housing described above is installed on the wall by first resting mounting flanges 23 on crosspiece 14 and aligning the housing with rectangular opening 12. A series of mounting holes 24 are provided in mounting flanges 21 and 22 to receive screws or nails to secure the housing to the inside wall. In the installed position inwardly facing mounting flanges 23 rest in part on crosspiece 14. While it is preferred to employ a separate crosspiece 14 nailed to the wall, it is within the scope of this invention to secure crosspiece 14 to flanges 23 to form part of the housing and thereafter secure the housing around opening 12 as a unit.

A reversly bent stiffening edge 25 is formed on the forward edge of rectangular section 15 to stiffen the section and to provide a rounded edge for an operating cable 26 to be described.

The crux of applicant's invention resides in the curved baffle 27 operating in a pair of spaced open support bearings 28. Since both bearings are the same, only one bearing will be described. Each trapezoidal section 16 supports a bearing 28 mounted on an inwardly extending flange 23. Each bearing 28 is formed of a strip of metal 29 bent into a unique shape and fastened to flange 23 and a lower inside portion of trapezoidal section 16 by spot welding or any other suitable fastening means.

Figure 4:
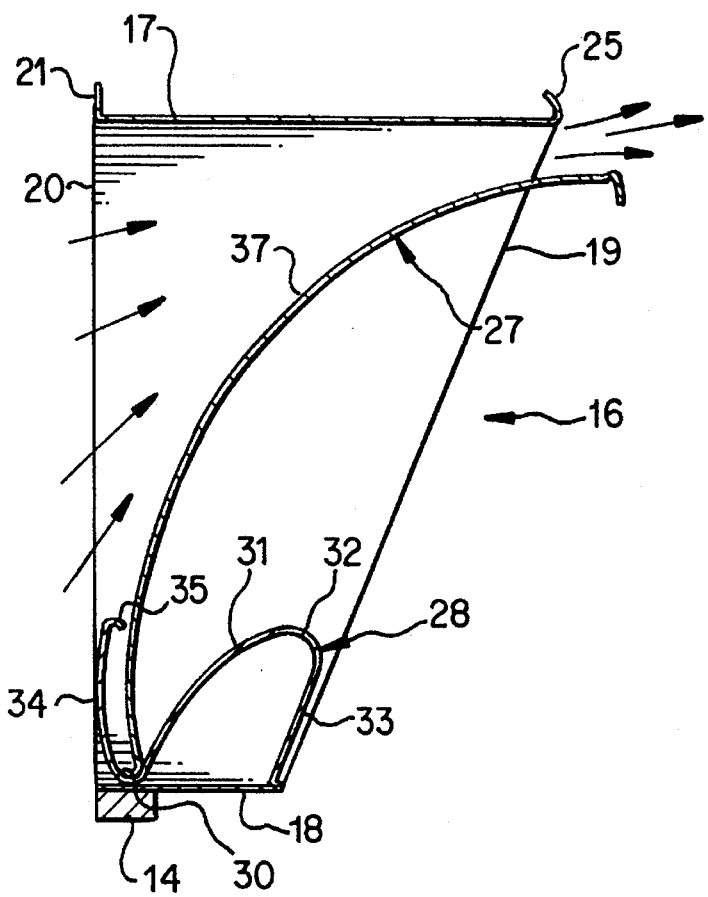
FIG. 4 is a view taken along line 4—4 of FIG. 1.

Referring now to FIGS. 1 and 4, strip 29 of bearing 28 is first formed with a valley portion 30 secured to mounting flange 23 at the bottom of the valley at a location to overlie crosspiece 14. The forward side of the valley is extended in an upwardly slanted direction to provide a camming surface 31 with a rounded top 32. The strip 29 is then downwardly extended at 33 to be secured to flange 23. It should be noted that strip 29 consisting of sections 31, 32 and 33 forward of valley 30 form a closed, slanted, inverted U-shaped structure supported by flange 23 and trapezoidal section 16. The rear side of valley 30 is formed with an upwardly extending tailpiece 34 terminating in a forwardly extending hook portion 35. The operation of open bearings 28 will be explained following the description of baffle 27.

Figure 3:
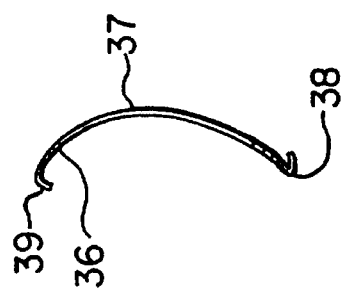
FIG. 3 is a view taken along line 3—3 of FIG. 2.
Figure 2:
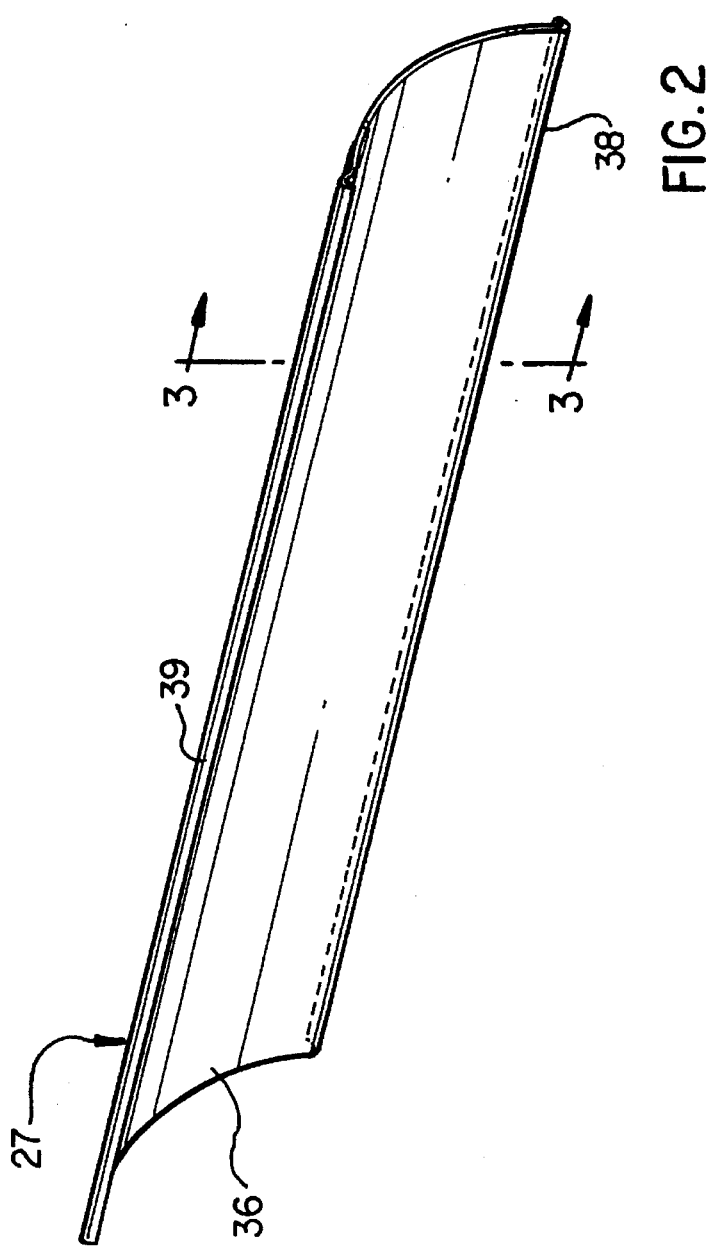
FIG. 2 is a perspective view of the baffle per se.

Referring now to FIGS. 2 and 3, the baffle 27 comprises an elongated curved section having a concave side 36 facing in a forward direction and a convex side 37 facing in a rear direction. The exact shape of the baffle is not critical but the curvature is somewhat greater than circular. To give the reader a sense of proportion, in a tested sample the baffle was made of sheet metal and was 46 inches long with a curved section somewhat greater than a 120 degree arc of a circle having a diameter of 22 inches. However, it must be emphasized that the exact curvature of the baffle is not critical and can vary for different sizes of air handlers.

The bottom edge of baffle 27 is bent back to form flange 38 with a rounded edge extending for the entire length of the baffle. The top edge of the baffle is formed with a forwardly extending stiffening edge 39.

Referring to FIG. 1, the baffle 27 which is sized to fit between trepezoidal sections 16 is inserted between the sections until the rounded edge 38 rests in valley 30 of open bearing 28. As seen in FIG. 4, baffle 27 is held in valley 30 solely by the weight of the baffle and can pivot around 30 for a limited range of travel. It can also be seen in FIG. 4 that the center of gravity of the baffle is forward of pivot 30 and if left unrestrained, will rotate around pivot 30 as seen in FIG. 6.

Movement of baffle 27 against the force of gravity is controlled by flexible line 26 attached at 40 to a central position in flange 39. From attachment 40, the cable is trained over rounded edge 25 to a pulley 41 and then to a control center, not shown. Operation of line 26 and control of baffle 27 may be achieved manually or automatically by means of a state of the art controller which measures all the relevant parameters.

Operation of the structure described so far will now be explained. With baffle 27 set in an upper position by line 26 as shown in FIG. 4 and the building exhaust fans in operation, makeup air will enter the building in accordance with the air patterns depicted by the arrows. Incoming air will be guided over the convex side 37 of the baffle and discharged at the top to sweep across the ceiling. This mode of operation is advantageous to reduce heating costs by circulating the warm air which naturally rises to the ceiling back down to the floor. It also aids in reducing floor drafts caused by the exhaust fans.

Figure 6:
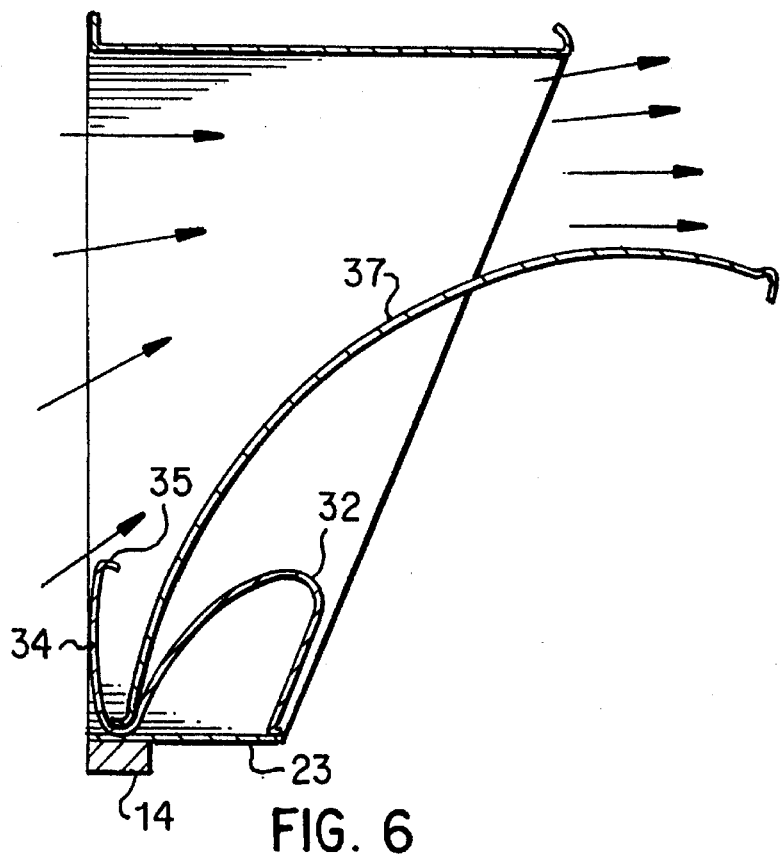
FIGS. 6 and 7 are schematic views illustrating the air flow in various baffle positions.

FIG. 6 depicts the air pattern when line 26 permits baffle 27 to rotate around pivot 30 creating a large discharge opening. This mode of operation is desirable in warm weather as there is a need for a greater volume of makeup air. In both the FIGS. 4 and 6 modes of operation, the rounded edge 38 of the baffle rests on crosspiece 14 to prevent air from exiting under the baffle. In FIG. 6 the large volume of air is guided by convex surface 37 to increase circulation across the floor.

In extremely hot weather it is desirable to direct a portion of the makeup air downwardly against the wall to ventilate the floor levels against the wall. This mode of operation will be explained in connection with FIG. 7. When line 26 permits further lowering of baffle 27 from the position of FIG. 6 to FIG. 7, the baffle rolls around camming surface 31 acting as a fulcrum and raises flange 38 above valley 30 and crosspiece 14. This allows a flow of air to take place between crosspiece 14 and concave side 36 of baffle 27 and to be downwardly directed as shown by the arrows. In addition, a portion of the main air flow above the baffle is also directed downwardly by convex surface 37 as shown by the arrows.

Figure 7:
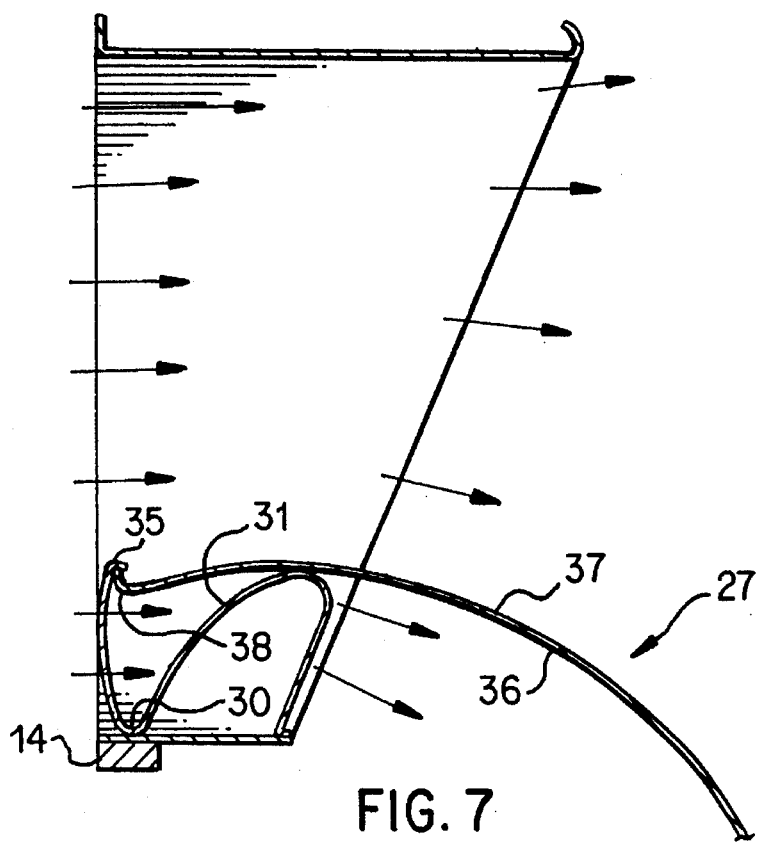

FIG. 7 shows the limiting position for this mode of operation where the free edge of flange 38 hooks under hook portion 35 of tail piece 34. Air flow under the baffle can be set between the fully closed position shown in FIG. 6 to the fully open position shown in FIG. 7.

While the invention as described above was fabricated using sheet metal, it should be clearly understood that the parts, particularly the baffle, can be made of plastic material having heat insulating properties. In addition, a plastic baffle may be made of light transmitting material as well as opaque material depending upon the lighting requirements of the building.

Figure 5:
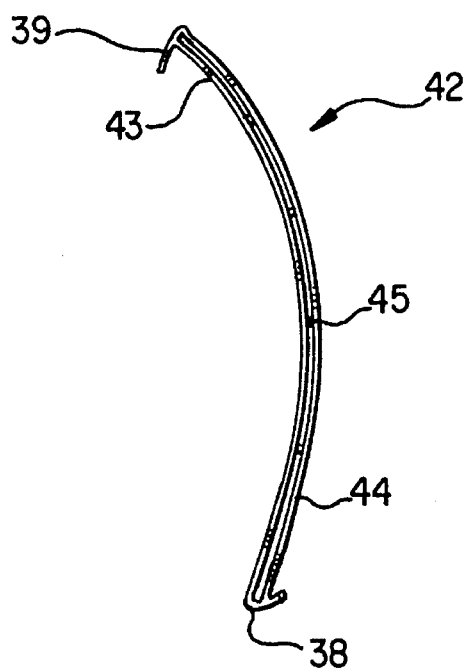
FIG. 5 is a cross sectional view of a double wall baffle.

FIG. 5 is a cross sectional view of a double walled baffle 42 formed of two spaced curved sections 43 and 44 formed of plastic material and separated by spacers 45. Flanges 38 and 39 are also formed of plastic material and are bonded to the respective ends of the baffle to perform the same function as in FIG. 3. The FIG. 5 construction is useful in extremely cold climates.

It is not intended to limit the present invention to the details of illustration or terms of description of the preferred embodiments shown above. It will be appreciated by those skilled in the art that various modifications and alterations therein may be made within the scope of the present invention.

What is claimed is:

1. An air handler mounted on the inside wall of a building having an opening to the outside, said air handler comprising a housing having a horizontal top section and two depending side sections framing said opening, upwardly facing open seat bearing means mounted on a bottom portion of each depending side section, and a single baffle extending across said opening, said baffle having a bottom edge and a top free edge, said bottom edge mounted on said open bearing means for pivotable and translatable motion, said baffle having a rear convex side facing said opening and a concave side facing said building interior and wherin each bearing means comprises a strip of material formed with a valley portion (30), an interiorly extending camming surface (31), a downward extension (33), a tail piece (34) extending in a rearward direction from said valley portion; and an interiorly extending hook portion (35) formed on the free end of said tail piece.

2. The combination of claim 1 wherein said baffle is made of a light transmitting material.

3. The combination of claim 1 wherein said baffle is made of a heat insulating material.

4. The combination of claim 1 wherein said baffle is formed of two spaced sheets defining a static air space therebetween to retard heat transfer.

5. The combination of claim 1 wherein said horizontal top section and said two depending side sections have outwardly extending flanges for mounting said housing on said wall.

6. The combination of claim 1 including means for rotating said baffle in said housing to control the volume and direction of air flow to the interior of the building.

7. The combination of claim 6 wherein the center of gravity of said baffle is located forward of said bottom edge in the direction of the building interior whereby said baffle is biased by gravity to a fully opened position.

8. The combination of claim 7 wherein the means for rotating said baffle in said housing comprises a cable and pulley system connected to a top medial portion of said baffle, extension and retraction of said cable resulting in said baffle moving in an open and closed position, respectively, against the force of gravity.

9. The combination of claim 1 wherein said baffle bottom edge is formed with a rearwardly extending rounded hook portion (38), said rounded hook portion seated in said valley portion of each bearing means.

10. The combination of claim 9 including a crosspiece (14) extending flush with the bottom side of the opening (12) and secured to said wall to lie in abutting relation with said rounded hook portion (38) of said baffle for its entire length to form therewith an air control gate.

11. The combination of claim 10 wherein said building comprises upper, medial, and inside interior locations, movement of said baffle from fully closed position to a position where the concave side of the baffle first contacts said camming surface (31) defines a first flow position directing air exclusively over the convex side of the baffle to said upper and medial interior locations.

12. The combination of claim 11 wherein further opening movement of said baffle results in said baffle rocking around said camming surfaces (31, 32) raising said rounded hook portion (38) above crosspiece (14) to define a second flow position directing air over the convex and concave sides of the baffle to upper, medial, and side wall interior locations.

13. The combination of claim 12 wherein said rounded edge (38) engages said hook portion (35) to define the limiting baffle position in said second flow position.

14. The combination of claim 1 wherein said baffle bottom edge remains in contact with said bearing means in said pivoting mode whereby makeup air travels only over the convex side of the baffle.

15. An air handler to control the makeup air supply in a confinement building for poultry and livestock wherein a negative pressure is maintained inside said building by exhaust air, said air handler comprising a housing framing an opening in the wall of the building, a baffle comprising a curved section having a bottom and top edge and a convex side facing the outside and a concave side facing the inside, open bearing support means, including a camming portion, the bottom edge of said baffle mounted on said open bearing means for pivoting and rocking motion modes to control the volume and direction of the makeup air and wherein said baffle bottom edge is raised by said camming portion above said bearing means in said rocking mode whereby makeup air travels over the convex and concave sides of the baffle, the air travelling over the concave side being downwardly directed.

16. A method of supplying makeup air to a building, said method comprising the steps of providing an opening in the wall of the building, mounting a single curved baffle within the opening having a convex side facing the outside and a concave side facing the inside, supporting the baffle in an open bearing means for pivotal and rocking motion from an upper limiting position wherein said baffle closes said opening to a medial position permitting air flow exclusively over the convex side of the baffle to a lower limiting position permitting air flow over both the convex and cancave sides of the baffle.

17. The method of claim 16 including the step of supporting the baffle in the bearing means with the center of gravity of the baffle forward of the bearing means.

18. The method of claim 17 including the step of providing a cable attached to an upper portion of the benefits to operate the baffle against the force of gravity.

* * * * *